United States Patent
Lokshin et al.

(10) Patent No.: US 8,249,804 B2
(45) Date of Patent: Aug. 21, 2012

(54) SYSTEMS AND METHODS FOR SMART CITY SEARCH

(75) Inventors: Anatole M. Lokshin, Huntington Beach, CA (US); Ailin Mao, Chino Hills, CA (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 742 days.

(21) Appl. No.: 12/195,152

(22) Filed: Aug. 20, 2008

(65) Prior Publication Data

US 2010/0049696 A1 Feb. 25, 2010

(51) Int. Cl.
*G01C 21/00* (2006.01)
*G01C 21/34* (2006.01)
*G08G 1/123* (2006.01)

(52) U.S. Cl. .................................................. 701/424

(58) Field of Classification Search .................. 701/200, 701/201, 202, 204, 206, 207, 208, 209, 210, 701/211; 707/713, 721, 723; 340/990, 995
See application file for complete search history.

(56) References Cited

U.S. PATENT DOCUMENTS

| | | | |
|---|---|---|---|
| 5,515,283 A | 5/1996 | Desai et al. | |
| 5,802,492 A | 9/1998 | DeLorme et al. | |
| 5,819,200 A * | 10/1998 | Tamai et al. | 701/400 |
| 5,832,408 A * | 11/1998 | Tamai et al. | 701/400 |
| 5,987,375 A * | 11/1999 | Tamai | 701/400 |
| 6,037,942 A * | 3/2000 | Millington | 715/835 |
| 6,049,755 A | 4/2000 | Lou et al. | |
| 6,067,502 A | 5/2000 | Hayashida et al. | |
| 6,078,864 A | 6/2000 | Long et al. | |
| 6,081,609 A | 6/2000 | Narioka | |
| 6,084,989 A | 7/2000 | Eppler | |
| 6,092,076 A | 7/2000 | McDonough et al. | |
| 6,107,944 A | 8/2000 | Behr et al. | |
| 6,108,603 A | 8/2000 | Karunanidhi | |
| 6,108,604 A | 8/2000 | Fukaga et al. | |
| 6,115,669 A | 9/2000 | Watanabe et al. | |
| 6,124,826 A | 9/2000 | Garthwaite et al. | |
| 6,125,326 A | 9/2000 | Ohmura et al. | |
| 6,141,621 A | 10/2000 | Piwowarski et al. | |
| 6,148,261 A | 11/2000 | Obradovich et al. | |
| 6,151,552 A | 11/2000 | Koizumi et al. | |
| 6,154,699 A | 11/2000 | Williams | |
| 6,163,269 A | 12/2000 | Millington et al. | |

(Continued)

FOREIGN PATENT DOCUMENTS

JP 2001194172 7/2001

(Continued)

OTHER PUBLICATIONS

International Patent Application No. PCT/US2008/084659, Written Opinion and International Search Report, Apr. 28, 2009.

(Continued)

*Primary Examiner* — Khoi Tran
*Assistant Examiner* — Harry Oh
(74) *Attorney, Agent, or Firm* — Winston Hsu; Scott Margo

(57) ABSTRACT

A method, machine-readable medium, and system involve receiving user input with a navigation device regarding a desired city name. A determination is made regarding whether the user input matches city names in a Last Used City List (LUCL). A Global City List (GCL) is consulted when the user input does not match the city names in the LUCL. A matching city name is selected as a best candidate.

18 Claims, 6 Drawing Sheets

U.S. PATENT DOCUMENTS

| | | | |
|---|---|---|---|
| 6,172,641 B1 | 1/2001 | Millington | |
| 6,175,801 B1 | 1/2001 | Millington | |
| 6,177,943 B1 | 1/2001 | Margolin | |
| 6,178,380 B1 | 1/2001 | Millington | |
| 6,184,823 B1 | 2/2001 | Smith et al. | |
| 6,189,130 B1 | 2/2001 | Gofman et al. | |
| 6,201,540 B1 | 3/2001 | Gallup et al. | |
| 6,204,778 B1 | 3/2001 | Bergan et al. | |
| 6,205,397 B1 | 3/2001 | Eslambolchi et al. | |
| 6,212,474 B1 | 4/2001 | Fowler et al. | |
| 6,223,118 B1 | 4/2001 | Kobayashi et al. | |
| 6,229,546 B1 | 5/2001 | Lancaster et al. | |
| 6,249,740 B1 | 6/2001 | Ito et al. | |
| 6,252,814 B1 | 6/2001 | Tran et al. | |
| 6,253,151 B1 | 6/2001 | Ohler et al. | |
| 6,256,029 B1 | 7/2001 | Millington | |
| 6,278,942 B1 | 8/2001 | McDonough | |
| 6,308,134 B1 | 10/2001 | Croyle et al. | |
| 6,320,517 B1 | 11/2001 | Yano et al. | |
| 6,321,158 B1 | 11/2001 | DeLorme et al. | |
| 6,349,257 B1 | 2/2002 | Liu et al. | |
| 6,356,210 B1 | 3/2002 | Ellis | |
| 6,360,167 B1 | 3/2002 | Millington et al. | |
| 6,362,751 B1 | 3/2002 | Upparapalli | |
| 6,363,322 B1 | 3/2002 | Millington | |
| 6,370,475 B1 | 4/2002 | Breed et al. | |
| 6,377,278 B1 | 4/2002 | Cutright et al. | |
| 6,381,536 B1 | 4/2002 | Satoh et al. | |
| 6,385,535 B2 | 5/2002 | Ohishi et al. | |
| 6,385,542 B1 | 5/2002 | Millington | |
| 6,397,145 B1 | 5/2002 | Millington | |
| 6,405,130 B1 | 6/2002 | Piwowarski | |
| 6,408,243 B1 | 6/2002 | Yofu | |
| 6,415,224 B1 * | 7/2002 | Wako et al. | 701/409 |
| 6,427,115 B1 | 7/2002 | Sekiyama | |
| 6,430,501 B1 | 8/2002 | Slominski | |
| 6,453,235 B1 | 9/2002 | Endo et al. | |
| 6,484,089 B1 | 11/2002 | Millington | |
| 6,484,094 B1 * | 11/2002 | Wako | 701/438 |
| 6,487,494 B2 | 11/2002 | Odinak et al. | |
| 6,515,595 B1 | 2/2003 | Obradovich et al. | |
| 6,529,822 B1 | 3/2003 | Millington et al. | |
| 6,529,824 B1 | 3/2003 | Obradovich et al. | |
| 6,539,301 B1 | 3/2003 | Shirk | |
| 6,565,610 B1 | 5/2003 | Wang et al. | |
| 6,574,551 B1 | 6/2003 | Maxwell et al. | |
| 6,609,062 B2 | 8/2003 | Hancock | |
| 6,631,322 B1 | 10/2003 | Arthur et al. | |
| 6,671,617 B2 | 12/2003 | Odinak et al. | |
| 6,704,649 B2 | 3/2004 | Miyahara | |
| 6,728,608 B2 | 4/2004 | Ollis et al. | |
| 6,728,636 B2 | 4/2004 | Kokijima et al. | |
| 6,748,323 B2 | 6/2004 | Lokshin et al. | |
| 6,765,554 B2 | 7/2004 | Millington | |
| 6,774,932 B1 | 8/2004 | Ewing | |
| 6,782,319 B1 | 8/2004 | McDonough | |
| 6,816,596 B1 | 11/2004 | Peinado et al. | |
| 6,819,301 B2 | 11/2004 | Nagamatsu et al. | |
| 6,839,628 B1 * | 1/2005 | Tu | 701/426 |
| 6,842,695 B1 | 1/2005 | Tu | |
| 6,873,907 B1 | 3/2005 | Millington et al. | |
| 6,885,874 B2 | 4/2005 | Grube et al. | |
| 6,917,982 B1 | 7/2005 | Dueck et al. | |
| 6,938,028 B1 | 8/2005 | Ito | |
| 7,031,834 B2 | 4/2006 | Ito et al. | |
| 7,031,836 B2 | 4/2006 | Branch | |
| 7,058,504 B2 | 6/2006 | McDonough et al. | |
| 7,170,518 B1 | 1/2007 | Millington et al. | |
| 7,218,246 B2 * | 5/2007 | Chiba | 340/990 |
| 7,233,860 B2 | 6/2007 | Lokshin et al. | |
| 7,260,475 B2 | 8/2007 | Suzuki | |
| 7,321,826 B2 | 1/2008 | Sheha et al. | |
| 7,333,820 B2 | 2/2008 | Sheha et al. | |
| 7,343,242 B2 | 3/2008 | Breitenberger et al. | |
| 7,353,107 B2 | 4/2008 | Breitenberger et al. | |
| 7,379,812 B2 | 5/2008 | Yoshioka et al. | |
| 7,421,334 B2 | 9/2008 | Dahlgren et al. | |
| 7,480,566 B2 * | 1/2009 | Laverty | 701/426 |
| 7,512,487 B1 | 3/2009 | Golding et al. | |
| 7,546,202 B2 | 6/2009 | Oh | |
| 7,590,490 B2 | 9/2009 | Clark | |
| 7,925,438 B2 * | 4/2011 | Lo | 701/436 |
| 2002/0151315 A1 | 10/2002 | Hendrey | |
| 2003/0036842 A1 | 2/2003 | Hancock | |
| 2003/0036848 A1 | 2/2003 | Sheha et al. | |
| 2003/0167120 A1 | 9/2003 | Kawasaki | |
| 2003/0182052 A1 | 9/2003 | DeLorme et al. | |
| 2003/0191578 A1 | 10/2003 | Paulauskas et al. | |
| 2004/0204821 A1 * | 10/2004 | Tu | 701/200 |
| 2005/0107948 A1 | 5/2005 | Catalinotto | |
| 2006/0080031 A1 | 4/2006 | Cooper et al. | |
| 2006/0089788 A1 * | 4/2006 | Laverty | 701/202 |
| 2006/0106534 A1 | 5/2006 | Kawamata et al. | |
| 2006/0212217 A1 | 9/2006 | Sheha et al. | |
| 2006/0265422 A1 | 11/2006 | Ando et al. | |
| 2007/0027628 A1 | 2/2007 | Geelen | |
| 2007/0073480 A1 | 3/2007 | Singh | |
| 2007/0088494 A1 | 4/2007 | Rothman et al. | |
| 2007/0130153 A1 | 6/2007 | Nachman et al. | |
| 2007/0204218 A1 | 8/2007 | Weber et al. | |
| 2007/0213929 A1 | 9/2007 | Tanizaki et al. | |
| 2007/0233384 A1 | 10/2007 | Lee | |
| 2008/0076451 A1 | 3/2008 | Sheha et al. | |
| 2008/0134088 A1 | 6/2008 | Tse et al. | |
| 2008/0167809 A1 * | 7/2008 | Geelen | 701/209 |
| 2008/0177470 A1 | 7/2008 | Sutardja | |
| 2009/0138190 A1 | 5/2009 | Kulik | |
| 2009/0150064 A1 | 6/2009 | Geelen | |
| 2009/0171576 A1 * | 7/2009 | Kim et al. | 701/209 |
| 2009/0171584 A1 | 7/2009 | Liu | |
| 2009/0182498 A1 | 7/2009 | Seymour | |
| 2009/0182500 A1 | 7/2009 | Dicke | |
| 2009/0187340 A1 | 7/2009 | Vavrus | |
| 2009/0187341 A1 | 7/2009 | Vavrus | |
| 2009/0187342 A1 | 7/2009 | Vavrus | |
| 2009/0216732 A1 * | 8/2009 | Feng | 707/4 |
| 2009/0326794 A1 * | 12/2009 | Lungwitz et al. | 701/200 |
| 2010/0286901 A1 * | 11/2010 | Geelen et al. | 701/200 |

FOREIGN PATENT DOCUMENTS

| | | |
|---|---|---|
| JP | 2002048574 | 2/2002 |
| JP | 2006250875 | 9/2006 |
| JP | 2007155582 | 6/2007 |
| JP | 2007178182 | 7/2007 |
| JP | 2008002978 | 1/2008 |
| KR | 19990011004 | 2/1999 |
| KR | 19990040849 | 6/1999 |
| KR | 20020084716 | 11/2002 |
| KR | 20040106688 | 12/2004 |
| KR | 20070080726 | 8/2007 |
| WO | 2008070226 | 6/2008 |
| WO | 2008073717 | 6/2008 |
| WO | 2008100656 | 8/2008 |
| WO | 2008112335 | 9/2008 |
| WO | 2008130722 | 10/2008 |
| WO | 2008134093 | 11/2008 |
| WO | 2009036052 | 3/2009 |

OTHER PUBLICATIONS

International Patent Application No. PCT/US2009/030177, Written Opinion and International Search Report, Apr. 29, 2009.

International Patent Application No. PCT/US2009/030314, Written Opinion and International Search Report, May 25, 2009.

Shamir, Adi et al., "Playing 'Hide and Seek' with Stored Keys," Lecture Notes in Computer Science, vol. 1648, 1991, pp. 118-124.

Transaction History of related U.S. Appl. No. 12/016,982, filed Jan. 18, 2008, entitled "Method and Apparatus for Access Point Recording Using a Position Device."

Transaction History of related U.S. Appl. No. 12/188,139, filed Aug. 7, 2008, entitled "System and Method to Record a Present Trip."

Transaction History of related U.S. Appl. No. 12/013,384, filed Jan. 11, 2008, entitled "Systems and Method to Provide Navigational Assistance Using an Online Social Network."

Transaction History of related U.S. Appl. No. 12/192,018, filed Sep. 22, 2008, entitled "Route Navigation via a Proximity Point."

International Patent Application Serial No. PCT/US2009/030176, Written Opinion and International Search Report, mailed Sep. 1, 2009.

USPTO Tranaction History of related U.S. Appl. No. 08/691,663, filed Aug. 2, 1996, entitled "Method Providing a Textual Description of a Remote Vehicle Location," now U.S. Patent No. 6,141,621.

USPTO Transaction History of related U.S. Appl. No. 08/691,727, filed Aug. 2, 1996, entitled "System and Method for Controlling a Vehicle Emergency Response Network," now U.S. Patent No. 6,539,301.

USPTO Transaction History of related U.S. Appl. No. 08/710,473, filed Sep. 18, 1996, entitled "Navigation Simulator and Recorder," now U.S. Patent No. 5,922,041.

USPTO Transaction History of relatedd U.S. Appl. No. 08/713,625, filed Sep. 13, 1996, entitled "Navigation System With Vehicle Service Information," now U.S. Patent No. 5,819,201.

USPTO Transaction History of related U.S. Appl. No. 08/713,627, filed Sep. 13, 1996, entitled "Navigation System With User Definable Cost Values," now U.S. Patent No. 5,878,368.

USPTO Transaction History of related U.S. Appl. No. 08/762,012, filed Dec. 11, 1996, entitled "Navigation System With Forward Looking Origin Selection for Route Re-Calculation," now U.S. Patent No. 6,405,130.

USPTO Transaction History of related U.S. Appl. No. 09/037,772, filed Mar. 10, 1998, entitled "Navigation System Character Input Device," now U.S. Patent No. 6,037,942.

USPTO Transaction History of related U.S. Appl. No. 09/056,218, filed Apr. 7, 1998, entitled "Navigation System using Position Network for Map Matching," now U.S. Patent No. 6,108,603.

USPTO Transaction History of related U.S. Appl. No. 09/062,518, filed Apr. 17, 1998, entitled "3-Dimensional Intersection Display for Vehicle Navigation System," now U.S. Patent No. 6,611,753.

USPTO Transaction History of related U.S. Appl. No. 09/096,103, filed Jun. 11, 1998, entitled "Navigation System With a Route Exclusion List System," now U.S. Patent No. 6,362,751.

USPTO Transaction History of related U.S. Appl. No. 09/099,963, filed Jun. 19, 1998, entitled "Autoscaling of Recommended Route," now U.S. Patent No. 6,574,551.

USPTO Transaction History of related U.S. Appl. No. 09/100,683, filed Jun. 19, 1998, entitled "Navigation System Map Panning Directional Indicator," now U.S. Patent No. 6,175,801.

USPTO Transaction History of related U.S. Appl. No. 09/114,670, filed Jul. 13, 1998, entitled "Navigation System Vehicle Location Display," now U.S. Patent No. 6,049,755.

USPTO Transaction History of related U.S. Appl. No. 09/118,030, filed Jul. 17, 1998, entitled "Navigation System With Predetermined Indication of Next Maneuver," now U.S. Patent No. 6,078,684.

USPTO Transaction History of related U.S. Appl. No. 09/160,068, filed Sep. 24, 1998, entitled "Navigation System With Anti-Alias Map Display," now U.S. Patent No. 6,163,269.

USPTO Transaction History of related U.S. Appl. No. 09/176,630, filed Oct. 22, 1998, entitled "Street Identification for a Map Zoom of a Navigation System," now U.S. Patent No. 6,178,380.

USPTO Transaction History of related U.S. Appl. No. 09/239,692, filed Jan. 29, 1999, entitled "Vehicle Navigation System With Location Based Multi-Media Annotation," now U.S. Patent No. 6,360,167.

USPTO Transaction History of related U.S. Appl. No. 09/418,749, filed Oct. 15, 1999, entitled "Navigation System With Road Condition Sampling," now U.S. Patent No. 6,484,089.

USPTO Transaction History of related U.S. Appl. No. 09/435,381, filed Nov. 5, 1999, entitled "Navigation System Character Input Device," now U.S. Patent No. 6,765,554.

USPTO Transaction History of related U.S. Appl. No. 09/470,438, filed Dec. 22, 1999, entitled "Navigation System With All Character Support," now U.S. Patent No. 6,256,029.

USPTO Transaction History of related U.S. Appl. No. 09/470,441, filed Dec. 22, 1999, entitled "Navigation System With Unique Audio Tones for Maneuver Notification," now U.S. Patent No. 6,363,322.

USPTO Transaction History of related U.S. Appl. No. 09/487,654, filed Jan. 19, 2000, entitled "Navigation System With Route Indicators," now U.S. Patent No. 6,430,501.

USPTO Transaction History of related U.S. Appl. No. 09/519,143, filed Mar. 6, 2000, entitled "Navigation System With Complex Maneuver Instruction," now U.S. Patent No. 6,397,145.

USPTO Transaction History of related U.S. Appl. No. 09/535,733, filed Mar. 27, 2000, entitled "Selective Rendering of Cartographic Entities for Navigation System," now U.S. Patent No. 7,170,518.

USPTO Transaction History of related U.S. Appl. No. 09/547,004, filed Apr. 11, 2000, entitled "Navigation System With Zoomed Maneuver Instruction," now U.S. Patent No. 6,529,822.

USPTO Transaction History of related U.S. Appl. No. 09/661,982, filed Sep. 18, 2000, entitled "Points of Interest for Navigation System," now U.S. Patent No. 6,374,180.

USPTO Transaction History of related U.S. Appl. No. 09/679,671, filed Oct. 5, 2000, entitled "Navigation System With Run-Time Training Instruction," now abandoned.

USPTO Transaction History of related U.S. Appl. No. 09/691,531, filed Oct. 18, 2000, entitled "Multiple Configurations for a Vehicle Navigation System," now U.S. Patent No. 6,385,542.

USPTO Transaction History of related U.S. Appl. No. 09/799,876, filed Mar. 6, 2001, entitled "Navigation System With Figure of Merit Determination," now U.S. Patent No. 6,741,928.

USPTO Transaction History of related U.S. Appl. No. 10/088,017, filed Sep. 9, 2002, entitled "Navigation System With User Interface," now U.S. Patent No. 6,873,907.

USPTO Transaction History of related U.S. Appl. No. 10/208,261, filed Jul. 31, 2002, entitled "Displaying Data," now U.S. Patent No. 6,748,323.

USPTO Transaction History of related U.S. Appl. No. 10/619,619, filed Jul. 16, 2003, entitled "Intelligent Modular Navigation Information Capability," now U.S. Patent No. 7,233,860.

USPTO Transaction History of related U.S. Appl. No. 11/327,450, filed Jan. 9, 2006, entitled "Smart Detour."

USPTO Transaction History of related U.S. Appl. No. 11/518,205, filed Sep. 11, 2006, entitled "Method and System of Securing Content and Destination of Digital Download Via the Internet."

USPTO Transaction History of related U.S. Appl. No. 11/675,817, filed Feb. 16, 2007, entitled "A Method of Generating Curved Baseline for Map Labeling."

USPTO Transaction History of related U.S. Appl. No. 11/684,301, filed Mar. 9, 2007, entitled "Method and Apparatus for Determining a Route Having an Estimated Minimum Fuel Usage for a Vehicle."

USPTO Transaction History of related U.S. Appl. No. 11/737,125, filed Apr. 18, 2007, entitled "Method and System Navigation Using GPS Velocity Vector."

USPTO Transaction History of related U.S. Appl. No. 11/740,280, filed Apr. 25, 2007, entitled "Adjusting Spatial Operations Based on Map Density."

USPTO Transaction History of related U.S. Appl. No. 11/840,610, filed Aug. 17, 2007, entitled "Methods and Apparatus for Measuring the Effectiveness of Advertisements Presented on a Mobile Navigation Device."

USPTO Transaction History of related U.S. Appl. No. 11/844,321, filed Aug. 23, 2007, entitled "Rerouting in Vehicle Navigation Systems."

USPTO Transaction History of related U.S. Appl. No. 11/852,973, filed Sep. 10, 2007, entitled "Nearest Neighbor Geographic Search."

USPTO Transaction History of related U.S. Appl. No. 11/906,277, filed Oct. 1, 2007, entitled "Static and Dynamic Contours."

USPTO Transaction History of related U.S. Appl. No. 11/945,211, filed Nov. 26, 2007, entitled "System and Method of Providing Traffic Data to a Mobile Device."

USPTO Transaction History of related U.S. Appl. No. 11/967,889, filed Jan. 1, 2008, entitled "System and Method for Accessing a Navigation System."

USPTO Transaction History of related U.S. Appl. No. 12/013,384, filed Jan. 11, 2008, entitled "System and Method to Provide Navigational Assistance Using an Online Social Network."

USPTO Transaction History of related U.S. Appl. No. 12/016,949, filed Jan. 18, 2008, entitled "Method and Apparatus for Hybrid Routing Using Breadcrumb Paths."

USPTO Transaction History of related U.S. Appl. No. 12/016,980, filed Jan. 18, 2008, entitled "Method and Apparatus to Search for Local Parking."

USPTO Transaction History of related U.S. Appl. No. 12/016,982, filed Jan. 18, 2008, entitled "Method and Apparatus for Access Point Recording Using a Position Device."

USPTO Transaction History of related U.S. Appl. No. 12/188,139, filed Aug. 7, 2008, entitled "System and Method to Record a Present Trip."

* cited by examiner

SYSTEMS AND METHODS FOR SMART CITY SEARCH

FIELD OF THE INVENTION

At least some embodiments of the disclosure relate generally to the field of navigation and, more particularly, searching of cities and locations.

BACKGROUND

Global Navigation Satellite Systems (GNSS) allow navigation services including automatic route calculation from a current location to a destination location and guiding a driver of a vehicle to that destination with real time instructions in conjunction with a visual display of route segments as the vehicle progresses along the route.

The satellites transmit signals comprising very precise location parameters and timing signals that are received by mobile device processors allowing a processor to determine their respective three dimensional positions and velocities.

Navigation systems conventionally provide a recommended route from a starting point to a desired destination. Typically, the starting point and desired destination are selected from a large database of roads stored in a mass media storage, such as a CD ROM or SD card, which includes the roads in the area to be traveled by the user. The navigation system can be, for example, located in a personal computer or installed in a vehicle or carried by a pedestrian. If the navigation system is installed in a vehicle, the starting point is typically the current position of the vehicle, which can be input to the navigation system by an associated position determining system that may include a GPS receiver.

The navigation system determines a route from the starting point to the destination. Usually there are many potential routes between the selected starting point and the desired destination. Typical navigation systems select a recommended route based upon certain "cost" values associated with each segment of road in the road database. These cost values include the length of the road segment and the estimated time of travel through the road segment. The navigation system selects the potential route with the lowest total cost to be the recommended route. Depending upon the conventional algorithm of the navigation system, the navigation system may, for example, recommend the route with the shortest total length, the lowest total time, or some weighted average of length and time.

The recommended route then may be displayed to the user as a map showing the starting point and desired destination and highlighting the recommended route. If the navigation system is installed in a vehicle, the navigation system may display the current position of the vehicle and provide turn-by-turn instructions to the driver, guiding the driver to the selected destination.

Navigation systems typically include a graphical user interface that allows a user to input the desired destination. The user often needs to input a city name for the desired destination, for example, as part of the destination address. As another example, the desired destination is a Point of Interest in or near a city. Since a full keyboard is impractical in a vehicle, a conventional graphical user interface includes a touch screen or a directional input device such as a four-way button. The user is presented with the letters of the alphabet arranged in a single large rectangular array, which is usually called soft keyboard. One typical system requires the user to scroll through the alphabet one letter at a time using the directional input device, selecting a desired letter when it becomes highlighted. These systems have the disadvantage of inputting a given letter. With such systems, inputting the city name can also be very time consuming and frustrating for a user.

Many conventional mobile navigation applications allow users to find a city by entering a partial or full city name. Such applications will search for matches in a global city name list sorted alphabetically. All city name matches contain the characters entered by the user as their leading substring. A Next-Letter-Tree (NLT) may be used to support city name entry on the soft keyboard. Because many city names have similar spellings, it usually takes many keystrokes to narrow down the matching cities. The applications may further ask users to pick a city among multiple matches if a partial name is input. Because it is inconvenient for a user to provide inputs to small mobile devices, users want to minimize the number of keystrokes to perform tasks such as locating a desired city.

SUMMARY

A method, machine-readable medium, and system involve receiving a user input with a navigation device regarding a desired city name. A determination is made regarding whether the user input matches city names in a Last Used City List (LUCL). A Global City List (GCL) is consulted when the user input does not match the city names in the LUCL. A matching city name is selected as a best candidate.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding of the invention. However, in certain instances, well known or conventional details are not described in order to avoid obscuring the description. References herein to one or an embodiment in the present disclosure can be, but are not necessarily, references to the same embodiment.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
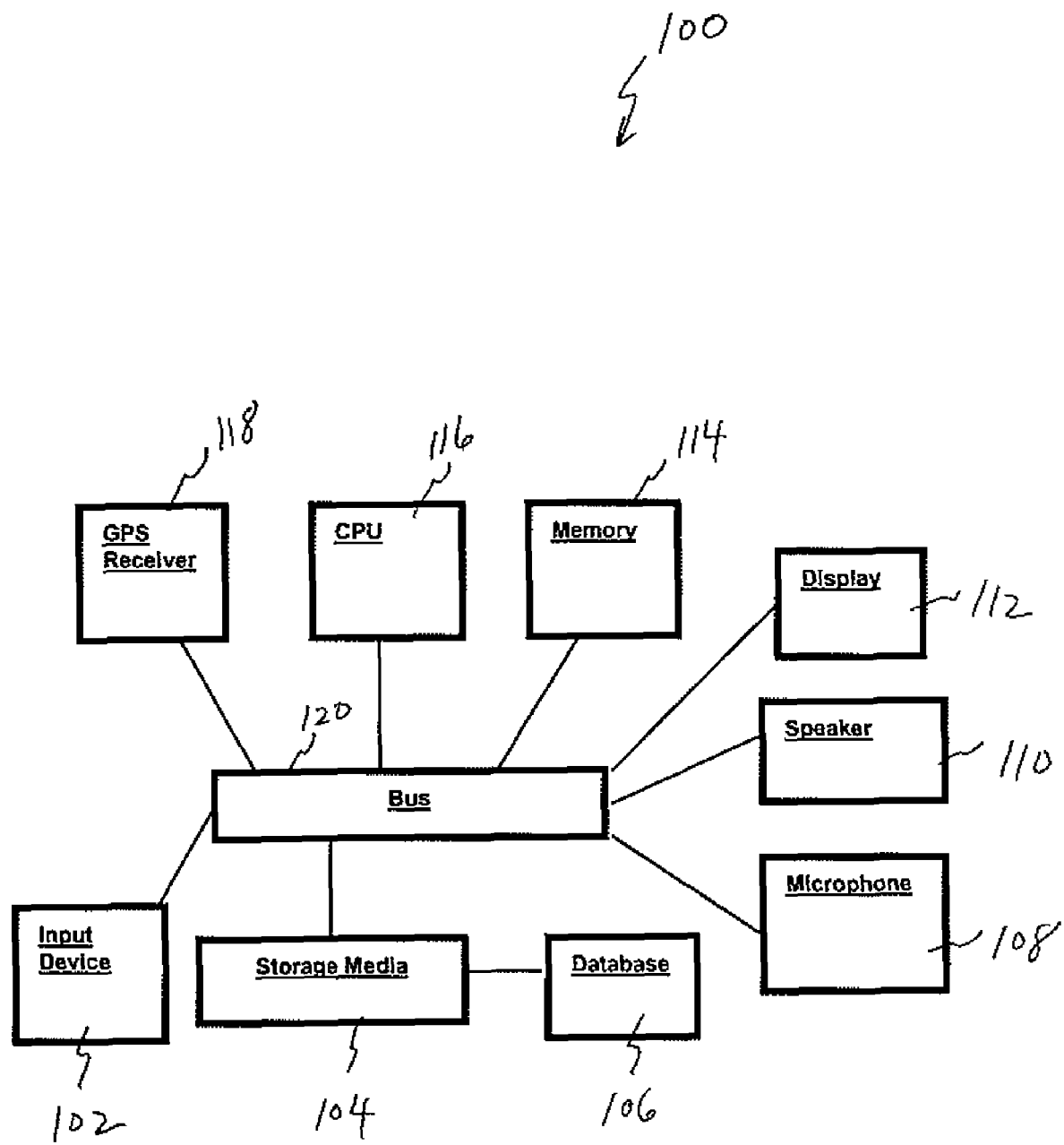
FIG. 1 is a block diagram of a navigation device in accordance with one embodiment of the present invention.

FIG. 1 is a block diagram of a navigation device 100 in accordance with one embodiment of the present invention. In one embodiment, the navigation device 100 is a GPS vehicle navigation device. The navigation device 100 includes an input device 102, a storage media 104, a database 106, a microphone 108, a speaker 110, a display 112, a memory 114, a CPU 116, and a GPS receiver 118 coupled together through a bus 120.

Figure 2:
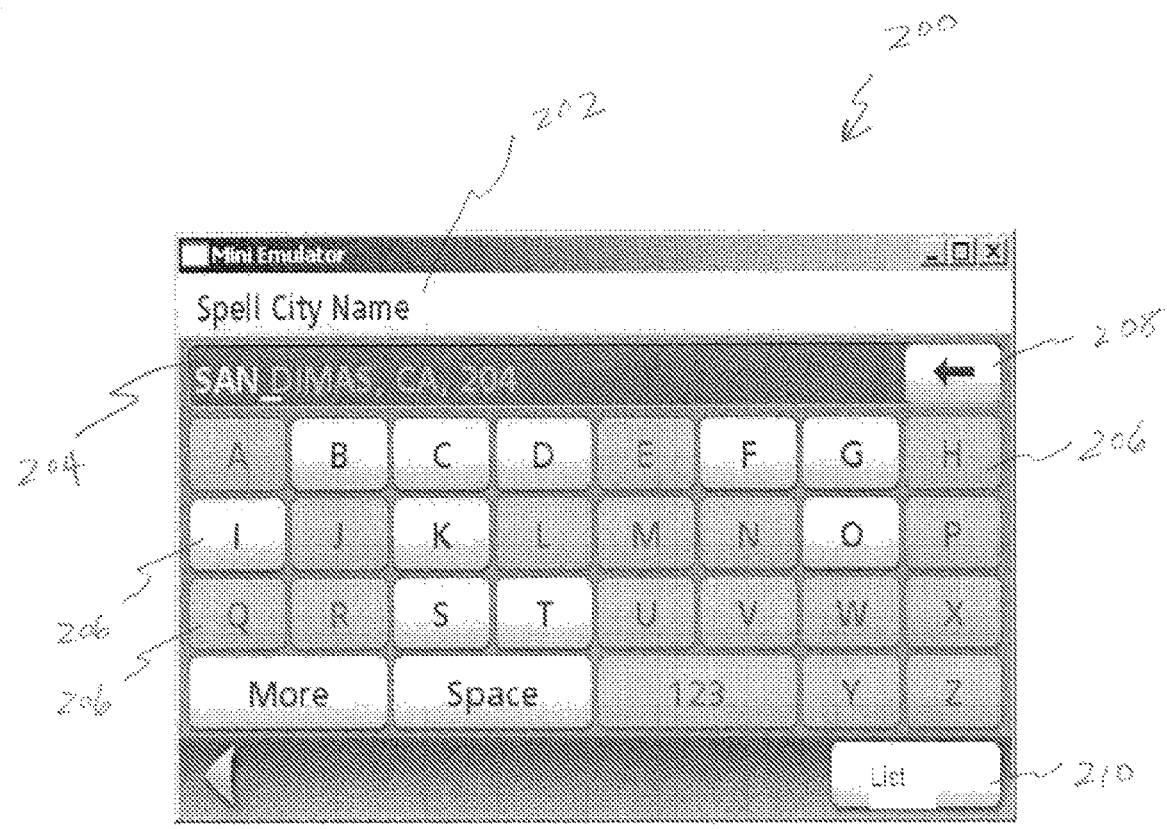
FIG. 2 illustrates an input screen in accordance with one embodiment of the present invention.

FIG. 2 illustrates an exemplary touch sensitive character input screen 200 as displayed on the input device 102. In one embodiment, a keyboard and mouse can be used instead of the input screen 200 to provide inputs to the navigation device 100. The input screen 200 includes a title field 202, an input textbox 204, alphanumberic keys 206, a backspace key 208, a list key 210, and other keys commonly found on a conventional keyboard. Not all keys 206 are necessarily enabled at a given time. As the user enters characters, keys 206 that are not likely to be used by the user may be disabled as indicated by the depicted shading for certain of the keys 206. In one embodiment, NLT can be used for predictive character selection.

A user sequentially depresses keys on the input screen 200 to enter the name of a city that the user wishes to find with the navigation device 100. Based on the characters or letters entered by the user, a "best" candidate for the city sought by the user is selected by the navigation device 100 and displayed in the input textbox 204.

To minimize keystrokes by the user, and optimize the speed of correctly determining the city name sought by the user, a best candidate is selected from sequential resort to the following two lists of cities: 1. Last Used City List (LUCL) and 2. Global City List, as described in more detail below. Once selected, the best candidate is displayed in the input textbox 204 after each character entry by the user. In this manner, space on the input screen 200 is conserved while, at the same time, the best candidate is displayed in response to character entry by the user. If users do not select the best candidate presented in the input textbox 204 and continue entering characters, this candidate is disregarded in the following candidate selections and the next best candidate is displayed.

In one embodiment, characters typed by the user in the input textbox 204 may be displayed in dark color while predicted characters are displayed in light color. The contrast between dark colored characters and light colored characters distinguishes the letters in the displayed city name that have been input by the user versus the letters in the displayed city name that have not been input by the user. In another embodiment, the characters input by the user and the characters not input by the user in the displayed city name are distinguished in another manner without the use of color or shade of the characters in the input textbox 204.

When the first character of the desired city name is typed by the user, the LUCL is checked first. The best candidate is the first match which contains the characters entered by the user as its leading substring. The LUCL contains a bound on or range of the number of city names that were last used by the user. In one embodiment, the number of last used city names in the LUCL is 20. In another embodiment, the number of last used city names in the LUCL is a number other than 20, depending on a particular application and other factors such as ease and speed of use. Likewise, the number of last used city names in the LUCL may even be a range of numbers.

The LUCL may contain a list of city names along with associated upper-level administrations such as the state in which the city is located. In one embodiment, the city name and associated upper-level administration of the best candidate are displayed together in the input textbox 204. In one embodiment, the LUCL may also contain the names of municipalities, counties, states, and other geographic regions and upper level administrations by themselves. Names of cities and other regions in the LUCL are unique, and the LUCL preferably does not contain duplicate occurrences of a city or other region.

The LUCL is sorted by time with the most recently selected city name positioned at the top of the LUCL. Other previously selected city names are then listed below the most recently selected city name, with the most recent selections at the top of the LUCL and the least recent selections at the bottom of the LUCL. The most recently selected city name is preferably stored in RAM during search. In the event of multiple city name matches with the input provided by the user, the first match is the most recently match in the LUCL, and is selected as the best candidate.

As stated above, the number of city names in the LUCL preferably does not exceed a certain number, or falls within a certain range. Accordingly, previously selected city names that fall outside the certain number or range of the LUCL do not appear in the LUCL. Limiting the size of the LUCL in this manner renders the LUCL easy to maintain. By sorting and prioritizing on the basis of previous selections, the number of sorts is minimized and the time required to find the city name sought by the user is fast.

As the user sequentially enters characters on the input screen 200, the best candidate from the LUCL is displayed in the input textbox 204. The user may select the best candidate by touching the displayed city name in the input textbox 204. In one embodiment, the user may select the displayed best candidate by touching another key on the input screen 200.

When there is no matching entry in the LUCL, the Global City List (GCL) is then checked for a city match that is geographically nearest to the user's current position. In accordance with the present invention, the GCL may be associated without a spatial index or with a spatial index.

When the GCL does not have a spatial index, the GCL includes a name list sorted alphabetically and, for each city, location information with an indication of latitude and longitude only. In accordance with the GCL, the navigation device 100 performs the following process to find a best candidate.

As a user of the navigation device 100 enters characters, a binary search is run to find upper and lower boundaries of a matching subset list in the alphabetically sorted GCL. The subset list is continuous. All city names in the subset list contain the characters entered by the user as their leading substring.

The subset list is re-sorted based on the geographic distance between each city name and the current position of the navigation device 100. Because the GCL does not have a spatial index, the calculation of geographic distances between the navigation device 100 and city names involves processing by the navigation device 100 and attendant delay. Thus, to ensure timely response, and to minimize undue delay, the subset list can be reduced to a manageable number of city names before re-sorting by adjusting the lower boundary if the number of city names exceeds a certain threshold.

In one embodiment, the threshold number of city names is approximately 200. In another embodiment, the threshold number depends on, for example, the processing speed and power of the navigation device 100 as well as other factors to optimize the speed of re-sorting the subset list for a particular environment and user expectations. In one embodiment, to save time, a Manhattan distance calculation algorithm is used as the geographic distance between each city name and the current position of the navigation device 100. In one embodiment, another distance calculation algorithm may be used for the geographical distance. The first city name in the re-sorted subset list, which is geographically nearest to the current position, is displayed as the best candidate.

Figure 3:
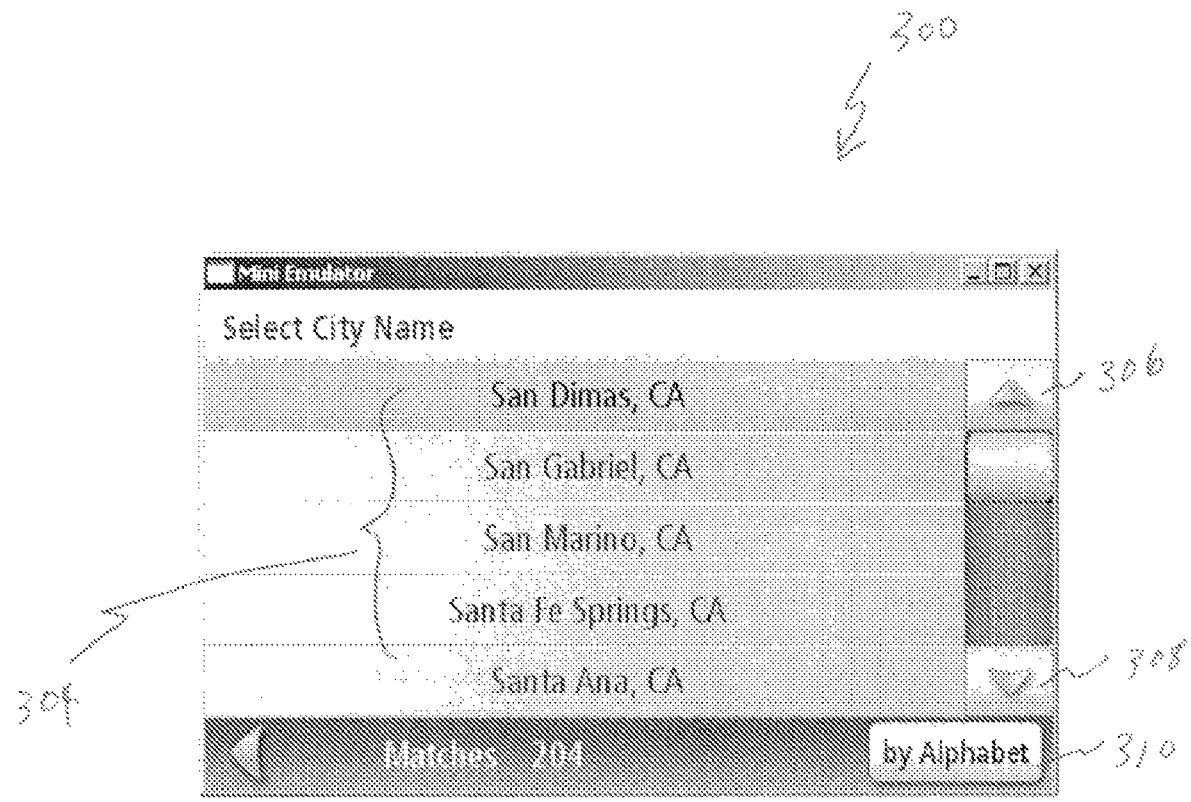
FIG. 3 illustrates a list screen in accordance with one embodiment of the present invention.

When the number of matches in the Global City List is larger than the threshold number, users are prompted to enter more characters. The best candidate is not necessarily the geographically nearest match in the Global City List. When the number of matches is smaller than the threshold number, the user has an option to display the subset list of matches sorted by geographic distance. In this regard, a list key 210 on the input screen 200 is enabled when the number of matches is smaller than the threshold number. The enabled list key 210 may be depressed when the displayed best candidate is not desired by the user. As shown in FIG. 3, depression of the enabled list key 210 causes display of a list screen 300 showing a list 304 of matching city names sorted by distance to the current position. The list screen 300 displays matching city names from the subset list. In one embodiment, the best candidate is highlighted in the list screen 300 and appears in the top portion of the list screen 300 where the user is more likely focused. An alphabetical order button 310 is located on the list screen 300. If the city name desired by the user cannot be easily found on the list screen 300, the user may depress the alphabetical order button 310. Upon depression of the alphabetical order button 310, all matching city names are displayed in the list screen 300 in alphabetical order. This option is also helpful for cases when the same city name exists in multiple regions.

A scroll up button 306 and a scroll down button 308 on the list screen 300 allow the user of the navigation device 100 to scroll through matching city names in the subset list and thus find the desired city name. In accordance with the present invention, only the top matching city names from the subset list needed to fill the list screen 300 are initially fetched and displayed on the list screen 300. By fetching only a portion of all the matching city names in the subset list, the time delay required to display city names on the list screen 300 can be minimized. The time savings is especially great when the subset list of matching city names is large. Through selection of the scroll up button 206 and the scroll down button 308, the user may scroll to matching city names in the subset list that are not initially displayed in the list screen 300. The matching city names are additionally fetched and displayed in accordance with scrolling by the user. By displaying matching city names as they are desired by the user, the present invention avoids the inefficiencies of conventional systems that retrieve city names from a global city list all at one time.

When a GCL that is sorted alphabetically includes a spatial index, searching for the geographically nearest city names is more efficient. In accordance with the present invention, the navigation device 100 performs the following process to search for the geographically nearest city names. City names within a predetermined distance from the current position of the navigation device 100, or search radius, are retrieved. The predetermined distance can be appropriately increased if the number of city names within the predetermined distance is small or decreased if the number of city names within the predetermined distance is large. The subset list is re-sorted based on the geographic distance between each city name and the current position of the navigation device 100 and the user. In one embodiment, to save time, Manhattan distance calculation algorithm can be used.

As characters are entered by the user, the first matching city name will have a leading substring that matches the characters entered by the user. The first matching city name in the re-sorted subset list is displayed as the best candidate.

If there is no city name in the subset list that matches the characters inputted by the user, the first matching city name in the GCL is selected as the best candidate. The best candidate is then displayed.

At the option of the user, the list key 210 can be depressed by the user to see on the list screen 300 all matching city names in the subset list within the predetermined distance sorted by geographic distance. If there is no matching city name in the subset list, all matching city names in the GCL can be displayed. Otherwise, upon depression of the alphabetical order button 310, all matching city names are displayed in the list screen 300 in alphabetical order.

Voice recognition can also be used in accordance with the present invention. The user can provide city names using spoken words and voice commands as user input to the navigation device 100 appropriately configured to receive such words and commands. Once spoken words or voice commands are received by the navigation device 100, a phrase matching the city name provided by the user is searched for in a recognition vocabulary and a best candidate is found. In one embodiment, the recognition vocabulary is the GCL. Because the GCL can be quite large and because some city names have the same or similar pronunciation, multiple matching city names may exceed a predefined confidence level. When two or more matching city names exceed the predefined confidence level, the LUCL and the geographic distance from the city name to the current position of the navigation device 100 can be used to filter or resort matching city names accordingly and the device can present the best candidate or a list of candidates in a sorted order.

As provided by the present invention, the selection of a desired city name is optimized because users desiring mobile navigation information often target or prefer city names that they have selected before or that are near their current position. Further, as provided by the present invention, the time required to find and select a desired city name is fast and often immediate.

Figure 4:
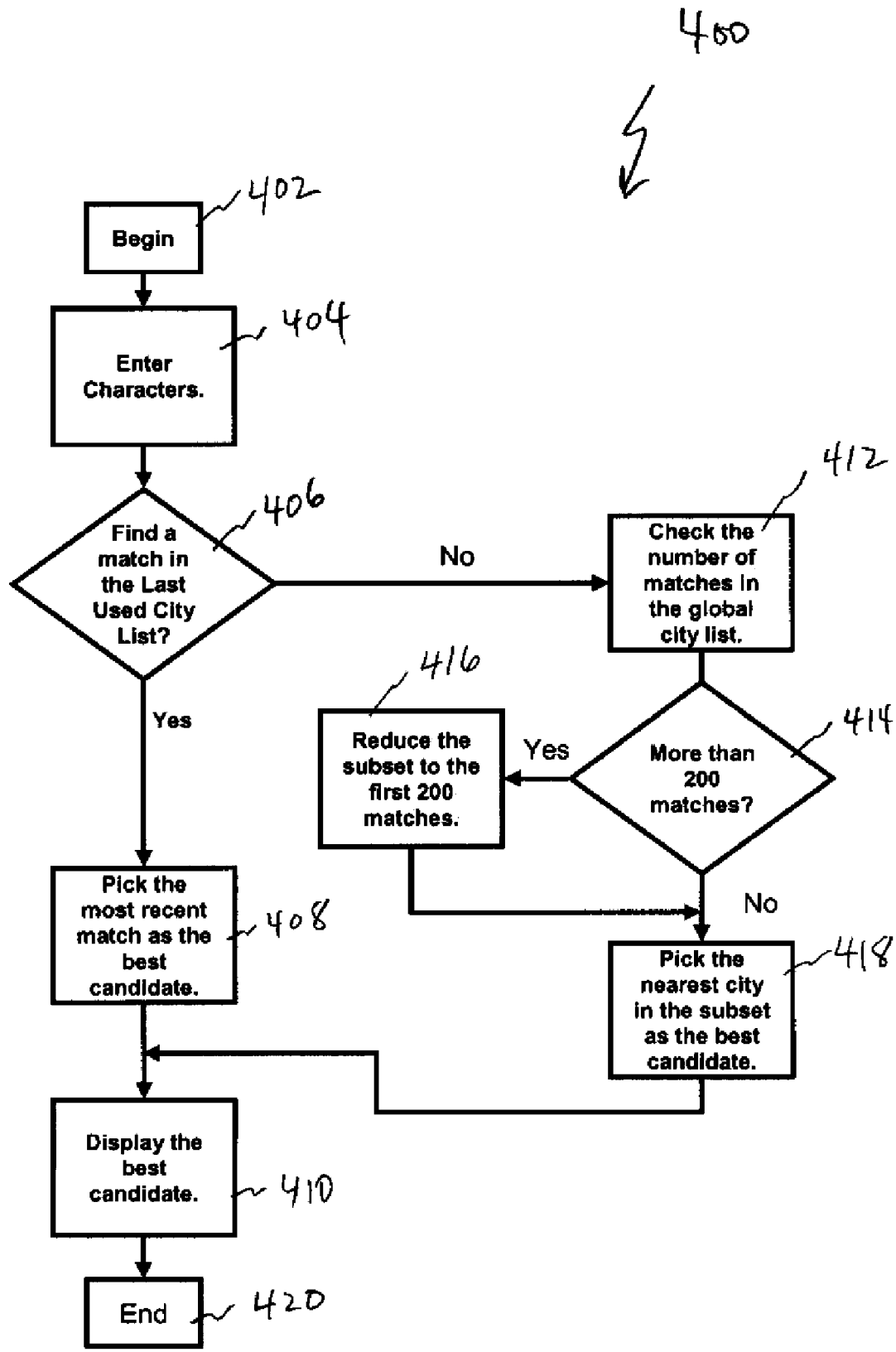
FIG. 4 is a flow chart of a method to find a best candidate when a city list does not include a spatial index in accordance with one embodiment of the present invention.

FIG. 4 is a flow chart of an exemplary method 400 involving determination of a best candidate when the GCL has no spatial index. The method begins at block 402 and proceeds to block 404. At block 404, characters entered by the user are received by the navigation device 100. The method 400 proceeds to decision block 406 where the navigation device 100 attempts to find a matching city name in the LUCL based on the user input. If a matching city name is found, the method 400 proceeds to block 408 where the most recently used matching city name is picked as the best candidate. The method 400 proceeds to block 410 where the best candidate is displayed. The method 400 proceeds to block 420 where the method 400 ends.

If a matching city name is not found at decision block 406, the method 400 proceeds to block 412. At block 412, the number of matching city names in the GCL is checked, and the method 400 proceeds to decision block 414. At decision block 414, if the number of matching city names exceeds a threshold number (for example, 200), the method 400 proceeds to block 416. At block 416, the subset list is reduced to the first matching city names within the threshold number (for example, 200), and the method 400 proceeds to block 418. At block 418, the geographically nearest matching city name is picked as the best candidate, and the method 400 proceeds to block 410. At block decision 414, if the number of matching city names does not exceed a threshold number (for example, 200), the method 400 proceeds to block 418.

Figure 5:
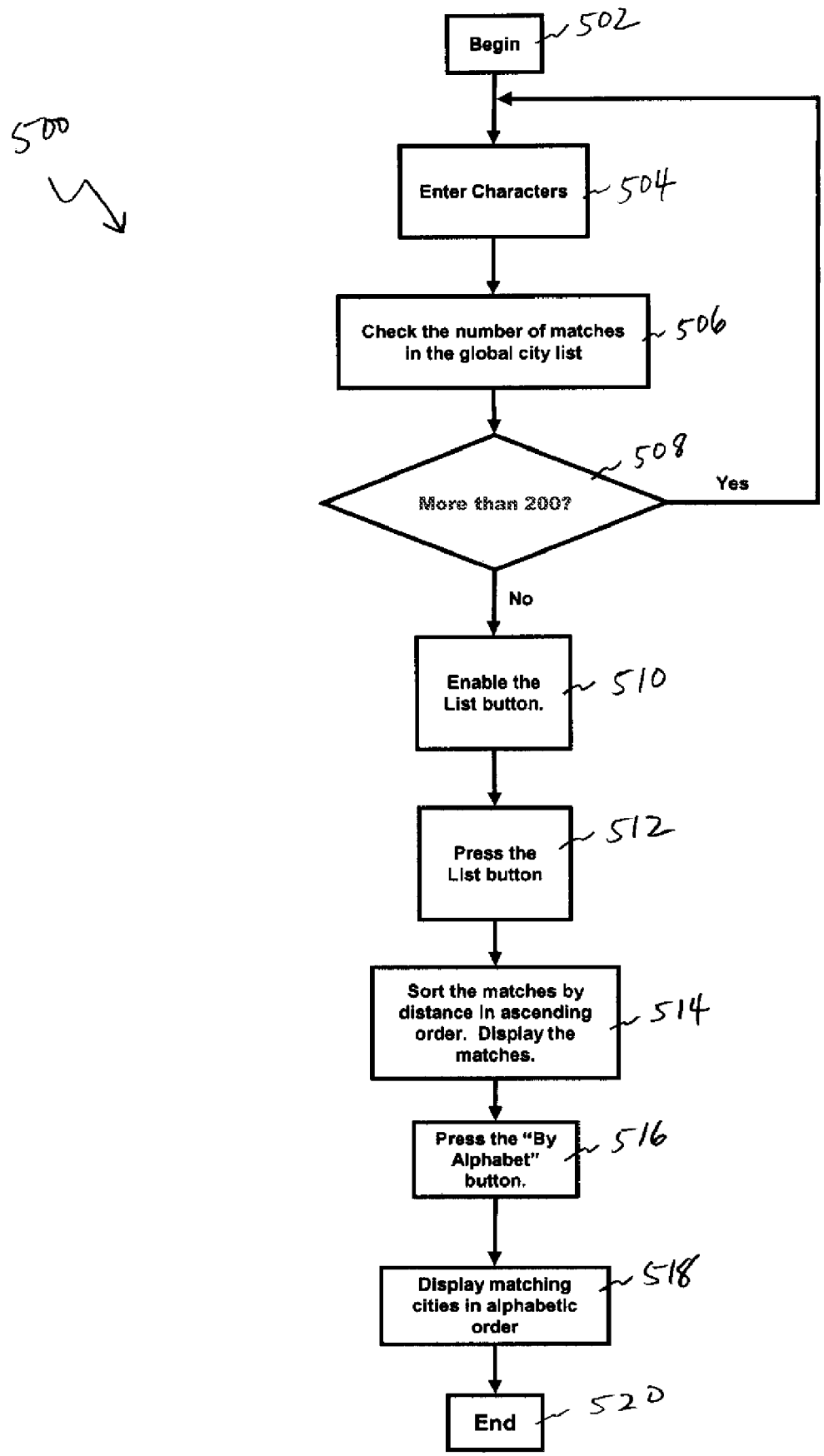
FIG. 5 is a flow chart of a method to list matching cities by distance in accordance with one embodiment of the present invention.

FIG. 5 is a flow chart of an exemplary method 500 involving the listing of matching city names by geographic distance when the GCL has no spatial index. The method 500 begins at block 502 and proceeds to block 504. At block 504, characters entered by the user are received by the navigation device 100. The method 500 proceeds to block 506 where the number of matching city names in the GCL is checked. The method proceeds to decision block 508 where it is determined whether the number of matching city names exceeds a certain threshold (e.g., 200). If so, the method 500 proceeds to block 504 where more characters are entered by the user. If not, the method 500 proceeds to block 510 where the list key 210 is enabled.

The method 500 proceeds to block 512 where an indication that the list key 210 has been depressed is received. The method 500 proceeds to block 514 where the matching city names are sorted in geographic distance in ascending order and displayed in the list screen 300. The method 500 proceeds to block 516 where an indication that the alphabetical order button 310 has been depressed is received. The method 500 proceeds to block 518 where matching city names are displayed in alphabetical order. The method 500 proceeds to end at block 520.

Figure 6:
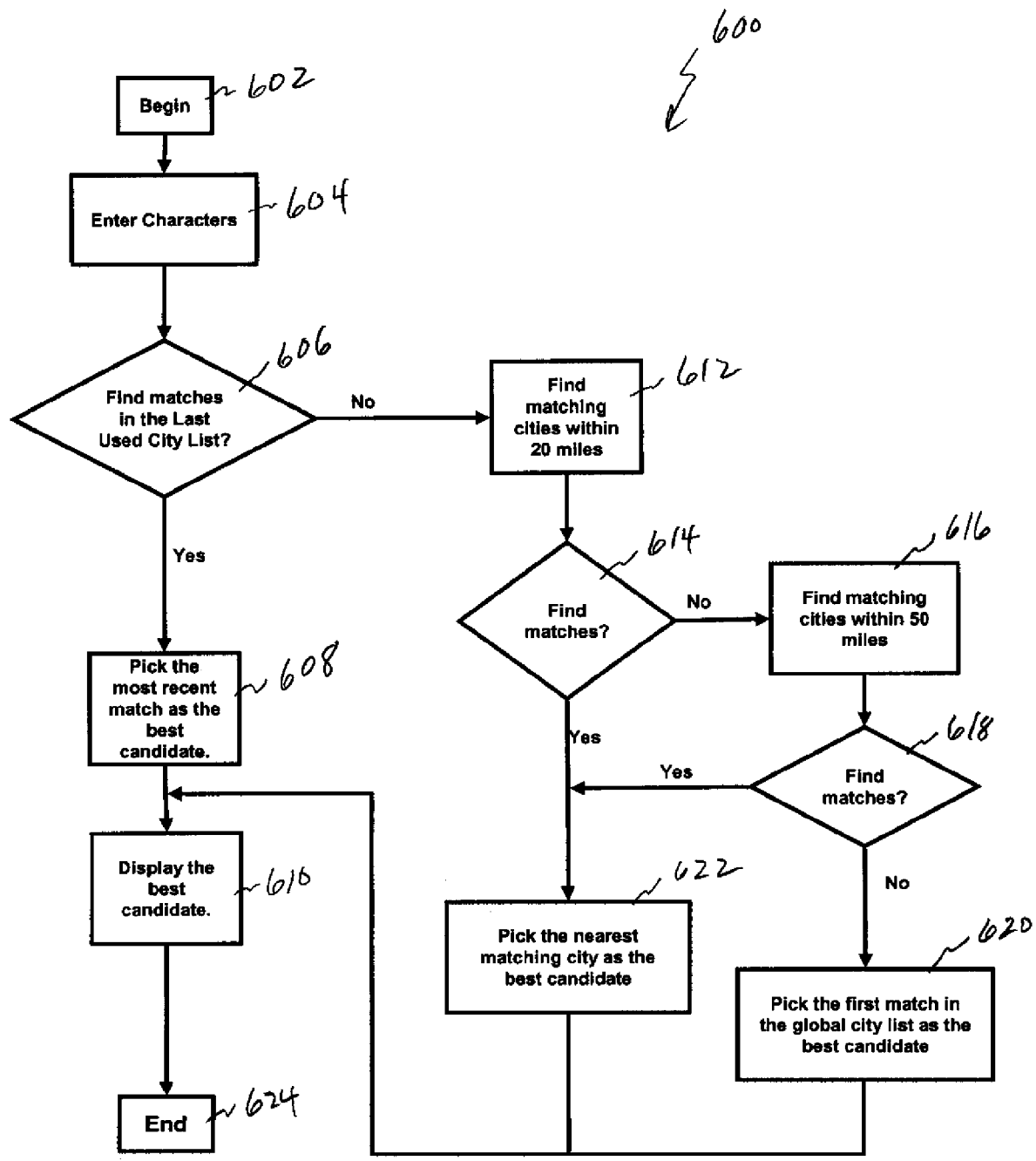
FIG. 6 is a flow chart of a method to find a best candidate when a city list includes a spatial index in accordance with one embodiment of the present invention.

FIG. 6 is a flow chart of an exemplary method 600 involving determination of a best candidate when the GCL has a spatial index. The method 600 begins at block 602 and proceeds to block 604 where characters input by the user are received by the navigation device 100. The method proceeds to decision block 606 where it is determined if matching city names are found in the LUCL. If so, the method 600 proceeds to block 608 where the most recently used matching city name is picked as the best candidate. The method 600 proceeds to block 610 where the best candidate is displayed and the method proceeds to block 624 where the method 600 ends.

At decision block 606, if matching city names are not found in the LUCL, the method 600 proceeds to block 612 where matching city names within a certain geographic distance (e.g., 20 miles) are searched for. The method 600 proceeds to decision block 614 where it is determined if any matching city names are found. If so, the method 600 proceeds to block 622 where the geographically nearest city is picked as the best candidate, and the method 600 proceeds to block 610. If not, the method 600 proceeds to block 616 where matching city names within another certain geographic distance (e.g., 50 miles) are searched for. The method 600 proceeds to decision block 618 where it is determined if any matching city names are found. If so, the method 600 proceeds to block 622. If not, the method 600 proceeds to block 620 where the first matching city name in the GCL is picked as the best candidate. The method 600 proceeds to block 610.

In one embodiment, the input device 102 of the navigation device 100 includes the touch sensitive character input screen 200 to receive user inputs. In one embodiment, a keyboard and a mouse are used instead of the input screen 200. The navigation device 100 includes the storage media 104, the database 106, and the memory 114, each of which may be constitute a machine-readable medium on which one or more sets of instructions (e.g., software) are stored. The one or more sets of instructions embody any one or more of the methodologies or functions described herein. The software may also reside, completely or at least partially, within the CPU 116 during execution thereof by the CPU 116 and the navigation device 100. The software may further be transmitted or received over a network.

The term "machine-readable medium" should be taken to include a single medium or multiple media (e.g., a centralized or distributed database, and/or associated caches and memory) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical, and magnetic media.

In general, the routines executed to implement the embodiments of the disclosure, may be implemented as part of an operating system or a specific application, component, program, object, module or sequence of instructions referred to as "programs." For example, one or more programs may be used to execute specific processes described herein. The programs typically comprise one or more instructions set at various times in various memory and storage devices in the machine, and that, when read and executed by one or more processors, cause the machine to perform operations to execute elements involving the various aspects of the disclosure.

Moreover, while embodiments have been described in the context of fully machines, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific exemplary embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer implemented method comprising:
   receiving, with a navigation device, user input regarding a desired city name;
   determining whether the user input matches a city name in a Last Used City List;
   when determined that the user input matches the city name in the Last Used City List, selecting the city name in the Last Used City List that matches the user input as a best candidate;
   when determined that the user input does not match any city name in the Last Used City List, consulting a Global City List, wherein consulting the Global City List includes:
      determining whether a number of city names in the Global City List matching the user input exceeds a predetermined threshold; and selecting a city name in the Global City List matching the user input that is geographically nearest to the navigation device as a best candidate when the number of city names in the Global City List matching the user input does not exceed the predetermined threshold; and displaying the best candidate in response to character entry by the user.

2. The method of claim 1, further comprising selecting the matching city name most recently used as the best candidate from the Last Used City List sorted by time.

3. The method of claim 1, wherein the consulting the Global City List further comprises having the GCL in alphabetical order.

4. The method of claim 1, wherein the consulting the Global City List further comprises reducing the number of matching city names to a predetermined threshold by picking first predetermined number of matches and disregarding the remainder when the number of matching city names exceeds the predetermined threshold.

5. The method of claim 1, further comprising:
enabling a list key of the navigation device when the number of matching city names in the Global City List does not exceed a predetermined threshold;
receiving an indication of selection of the list key; and
listing the matching city names.

6. The method of claim 5, further comprising sorting the matching city names by geographic distance.

7. The method of claim 6, further comprising:
receiving an indication to display the matching city names in alphabetical order; and
displaying the matching city names in alphabetical order.

8. The method of claim 5, further comprising:
checking the number of matching city names in the Global City List; and
receiving further user input regarding the desired city name until the number of matching city names does not exceed the predetermined threshold before the enabling, the receiving, and the listing.

9. The method of claim 1, wherein the consulting a Global City List with spatial index comprises:
selecting cities which are within a first predetermined geographic distance from the navigation device;
determining whether city names match a substring entered by a user; and
selecting the matching city name that is geographically nearest to the navigation device as the best candidate when the matching city names are within the first predetermined geographic distance from the navigation device.

10. The method of claim 9, wherein the consulting a Global City List with spatial index further comprises determining whether the matching city names are within a second predetermined geographic distance from the navigation device when no matching city names are found within the first predetermined geographic distance.

11. The method of claim 10, wherein consulting the Global City List with spatial index further comprises selecting a first of the matching city names in the Global City List as the first best candidate when none of the matching city names are within the second predetermined geographic distance.

12. The method of claim 10, wherein consulting the Global City List with spatial index further comprises selecting the matching city name that is geographically nearest to the navigation device as the first best candidate when the matching city names are within the second predetermined geographic distance.

13. The method of claim 10, wherein the second predetermined geographic distance is greater than the first predetermined geographic distance.

14. The method of claim 1, wherein the user input includes voice commands.

15. The method of claim 1, further comprising disregarding the best candidate presented previously and displaying a next best candidate, if a user does not select the previously presented best candidate and continues entering characters.

16. A non-transitory machine-readable medium that provides instructions for a processor, which when executed by the processor cause the processor to perform a method comprising:
receiving, with a navigation device, user input regarding a desired city name;
determining whether the user input matches a city name in a Last Used City List;
when determined that the user input matches the city name in the Last Used City List, selecting the city name in the Last Used City List that matches the user input as a best candidate;
when determined that the user input does not match any city name in the Last Used City List, consulting a Global City List, wherein consulting the Global City List includes:
determining whether a number of city names in the Global City List matching the user input exceeds a predetermined threshold; and
selecting a city name in the Global City List matching the user input that is geographically nearest to the navigation device as a best candidate when the number of city names in the Global City List matching the user input does not exceed the predetermined threshold; and
displaying the best candidate in response to character entry by the user.

17. The machine-readable medium of claim 16, wherein the consulting the Global City List (GCL) further comprises:
determining whether the number of matching city names exceeds a predetermined threshold; and
selecting the matching city name that is geographically nearest to the navigation device when the number of matching city names does not exceed the predetermined threshold.

18. A system comprising:
means for receiving user input regarding a desired city name;
means for determining whether the user input matches city names in a Last Used City List;
means for, when determined that the user input matches the city name in the Last Used City List, selecting the city name in the Last Used City List that matches the user input as a best candidate;
means for, when determined that the user input does not match any city name in the Last Used City List, consulting a Global City List, wherein consulting the Global City List includes:
determining whether a number of city names in the Global City List matching the user input exceeds a predetermined threshold; and
selecting a city name in the Global City List matching the user input that is geographically nearest to the navigation device as a best candidate when the number of city names in the Global City List matching the user input does not exceed the predetermined threshold; and
means for displaying the best candidate in response to character entry by the user.

* * * * *